US010500971B2

(12) United States Patent
Senol et al.

(10) Patent No.: US 10,500,971 B2
(45) Date of Patent: Dec. 10, 2019

(54) CIRCUIT ASSEMBLY FOR LINKING DIFFERENT ELECTRICAL VOLTAGE LEVELS, AS WELL AS CONTROL METHOD

(71) Applicant: RWTH Aachen, Aachen (DE)

(72) Inventors: Murat Senol, Aachen (DE); Rik W. De Doncker, Leuven (BE)

(73) Assignee: RWTH Aachen, Aachen (DE)

( * ) Notice: Subject to any disclaimer, the term of this patent is extended or adjusted under 35 U.S.C. 154(b) by 0 days.

(21) Appl. No.: 15/756,743

(22) PCT Filed: Aug. 31, 2016

(86) PCT No.: PCT/DE2016/100391
§ 371 (c)(1),
(2) Date: Mar. 1, 2018

(87) PCT Pub. No.: WO2017/036457
PCT Pub. Date: Mar. 9, 2017

(65) Prior Publication Data
US 2018/0244171 A1 Aug. 30, 2018

(30) Foreign Application Priority Data

Sep. 2, 2015 (DE) .................. 10 2015 114 640

(51) Int. Cl.
*B60L 15/00* (2006.01)
*H02P 27/06* (2006.01)
(Continued)

(52) U.S. Cl.
CPC ............. *B60L 15/007* (2013.01); *B60L 58/20* (2019.02); *H02P 27/06* (2013.01);
(Continued)

(58) Field of Classification Search
CPC ...... H02P 27/06; H02P 21/22; H02P 2209/01; B60L 15/007; B60L 2210/40; B60L 58/18; B60L 58/20; B60L 50/66; B60L 53/80
See application file for complete search history.

(56) References Cited

U.S. PATENT DOCUMENTS 6,066,928 A * 5/2000 Kinoshita ................. B60L 7/10
318/139
6,548,984 B2 * 4/2003 Shamoto ........... H02M 7/53873
318/801
(Continued)

FOREIGN PATENT DOCUMENTS

CH    698725 B1   10/2009
DE   19857645 A1    6/1999
(Continued)

OTHER PUBLICATIONS

International Search Report dated Dec. 12, 2016, in International Application No. PCT/DE2016/100391.
(Continued)

*Primary Examiner* — Thai T Dinh
(74) *Attorney, Agent, or Firm* — Stephan A. Pendorf; Patent Central LLC

(57) ABSTRACT

A circuit assembly for linking different electrical voltage levels in a motor vehicle, comprising: an electric machine containing induction coils in a star circuit connection with a star point; a first switch unit containing switch elements for generating an AC voltage for the electric machine from a DC voltage of a first voltage level; a DC voltage of a second voltage level; and a second switch unit for a bidirectional electrical energy flow between the DC voltage of the first voltage level and the DC voltage of the second voltage level, wherein the second switch unit has two switch elements arranged in series in an auxiliary switch branch, wherein the
(Continued)

Figure 1:
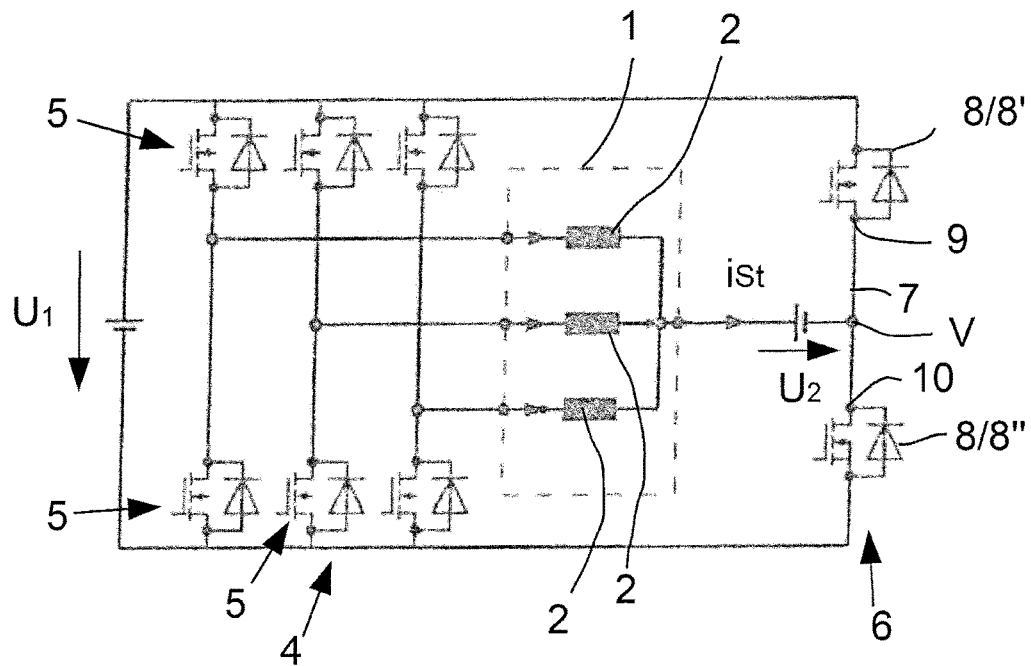

auxiliary switch branch is connected in parallel to the DC voltage of the first voltage level, and each connection of the switch elements is connected to the star point.

8 Claims, 2 Drawing Sheets

(51) Int. Cl.
  *B60L 58/20* (2019.01)
  *H02M 7/5387* (2007.01)
(52) U.S. Cl.
  CPC ....... *B60L 2210/10* (2013.01); *B60L 2210/40* (2013.01); *B60L 2210/42* (2013.01); *B60L 2220/12* (2013.01); *B60L 2220/54* (2013.01); *B60Y 2200/91* (2013.01); *B60Y 2200/92* (2013.01); *H02M 7/5387* (2013.01); *H02P 2209/01* (2013.01); *Y02T 10/641* (2013.01); *Y02T 10/645* (2013.01); *Y02T 10/7005* (2013.01); *Y02T 10/7066* (2013.01); *Y02T 10/7216* (2013.01); *Y02T 10/7241* (2013.01)

(56) References Cited

U.S. PATENT DOCUMENTS

| | | | | |
|---|---|---|---|---|
| 6,806,671 | B2 * | 10/2004 | Kusaka | B60L 58/20 318/442 |
| 6,930,460 | B2 * | 8/2005 | Ishikawa | B60L 3/0046 318/442 |
| 7,982,426 | B2 * | 7/2011 | Itoh | H02M 7/5387 318/108 |
| 9,908,430 | B2 * | 3/2018 | Gorka | B60L 15/02 |
| 2002/0105300 | A1 | 8/2002 | Moriya et al. | |
| 2008/0278102 | A1 * | 11/2008 | Taniguchi | B62D 5/046 318/400.27 |
| 2009/0093694 | A1 | 4/2009 | Taniguchi | |
| 2009/0206781 | A1 * | 8/2009 | Itoh | H02M 7/217 318/400.3 |
| 2010/0036555 | A1 | 2/2010 | Hosoda et al. | |
| 2013/0002186 | A1 * | 1/2013 | Iwahori | B60L 15/007 318/722 |
| 2014/0375232 | A1 * | 12/2014 | Findeisen | B60L 15/007 318/139 |

FOREIGN PATENT DOCUMENTS

| | | |
|---|---|---|
| DE | 102005015658 A1 | 1/2007 |
| DE | 102010023732 A1 | 12/2011 |
| DE | 102011053791 A1 | 3/2013 |
| EP | 2111683 B1 | 9/2010 |
| JP | 2009106098 A * | 5/2009 |
| JP | 2009106098 A | 5/2009 |
| JP | 2009177899 A | 8/2009 |
| JP | 2011250606 A | 12/2011 |

OTHER PUBLICATIONS

Search Report dated Jun. 13, 2016, in German Application No. 10 2015 114 640.0.

* cited by examiner

CIRCUIT ASSEMBLY FOR LINKING DIFFERENT ELECTRICAL VOLTAGE LEVELS, AS WELL AS CONTROL METHOD

The invention relates to a circuit assembly for linking different electrical voltage levels in a motor vehicle with
an electrical machine comprising induction coils in a star circuit connection with a star point,
a first switching unit containing switching elements for generating an alternating voltage for the electrical machine from a DC voltage of a first voltage level,
a DC voltage of a second voltage level, and
a second switching unit for a bidirectional electrical energy flow between the DC voltage of the first voltage level and the DC voltage of the second voltage level.

Furthermore, the invention relates to a method for controlling a converter which is connected between a DC voltage of a first voltage level and a DC voltage of a second voltage level comprising an electrical machine having induction coils in a star circuit connection with a star point, with a first switching unit associated with the electrical machine and a second switching unit for a bidirectional energy flow between the DC voltage of the first voltage level and the DC voltage of the second voltage level.

EP 2 111 683 B1 discloses a circuit assembly for linking different electrical voltage levels, so that a bidirectional flow of energy between, for example, a 12-volt battery and a 48-volt battery is ensured. To adapt these two voltage levels, a bidirectional DC/DC converter (DC-DC converter) is required, which has a relatively large volume and weight. There is therefore a need for less expensive and simpler circuit assemblies.

DE 10 2005 015 658 A1 discloses providing a circuit assembly for linking different electrical voltage levels, in which an electrical machine, which is connected as a consumer to a DC voltage of a first voltage level, is used in conjunction with a second switching unit to bring about a bidirectional energy flow between the DC voltage of the first voltage level and a DC voltage of the second voltage level. For this purpose, the second switching unit is connected, on the one hand, to a star point or neutral point of induction coils of the electric machine connected in a star connection and, on the other hand, to the DC voltage of the first voltage level. It is a disadvantage of the known circuit assembly that a part of the DC voltage of the first voltage level must always be tapped by the second switching unit.

The object of the present invention is to provide a circuit assembly for linking different electrical voltage levels and a method for controlling a converter in such a way that the circuit complexity is further reduced.

To solve this problem, the invention is characterized, in connection with the preamble of claim 1, in that the second switching unit has two mutually in series arranged switching elements in an additional switching branch, wherein the additional switching branch is connected in parallel to the DC voltage of the first voltage level and in each case a connection of switching elements is connected to the star or neutral point.

According to the invention, an additional switching branch is arranged parallel to a DC voltage of a first voltage level, wherein two switching elements are arranged in the additional switching branch, which is connected in each case with a connection to a star point of the electric machine. As a result, a necessary second switching unit for controlling the bidirectional energy flow between the DC voltage of the first voltage level and the DC voltage of the second voltage level advantageously has a simple structure. Preferably, a first switching unit, by means of which the electric machine is controlled and which is preferably designed as a bridge circuit, can be extended by an asymmetrical half bridge. Overall, the first switching unit and the second switching unit are composed of four half-bridges, which can be arranged in a space-saving manner, preferably arranged on a common carrier.

According to a development of the invention, the switching elements of the second switching unit are controlled such that a predetermined energy flow occurs between the DC voltage of the first and second voltage level on the one hand and the electrical machine on the other hand or between the DC voltage of the first voltage level on the one hand and the DC voltage of the second voltage level on the other hand. Depending on the requirements of different users, different levels of nominal voltage can thus be fed. The energy supply can be maintained independent of the running of the electric machine.

According to a development of the invention, a branch point to a star point of the electric machine is provided between two terminals of a first switching element and a second switching element of the same second switching unit. The second switching unit thus has a relatively simple structure.

Further advantages of the invention will become apparent from the other dependent claims.

To solve this problem, the invention is characterized, in connection with the preamble of claim 1, in that switching elements of the second switching unit are controlled such that a star or neutral point current of the electric machine flows in a predetermined direction with a predetermined amount according to the predetermined energy flow from the DC voltage first voltage level to the DC voltage of the second voltage level or from the DC voltage of the second voltage level to the DC voltage of the first voltage level.

The control method according to the invention reduces the control complexity.

Figure 2:
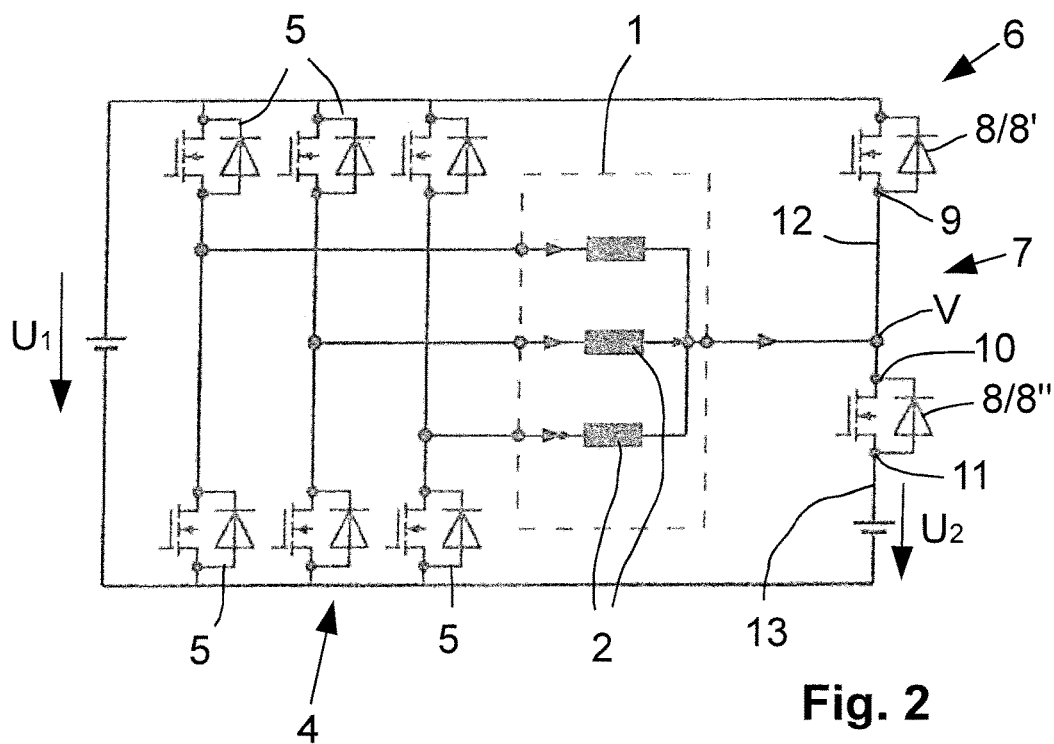

Exemplary embodiments of the invention are explained in more detail below with reference to the drawings:

There is shown in:

FIG. 1 a circuit assembly according to a first embodiment,

FIG. 2 a circuit assembly according to a second embodiment, and

Figure 3:
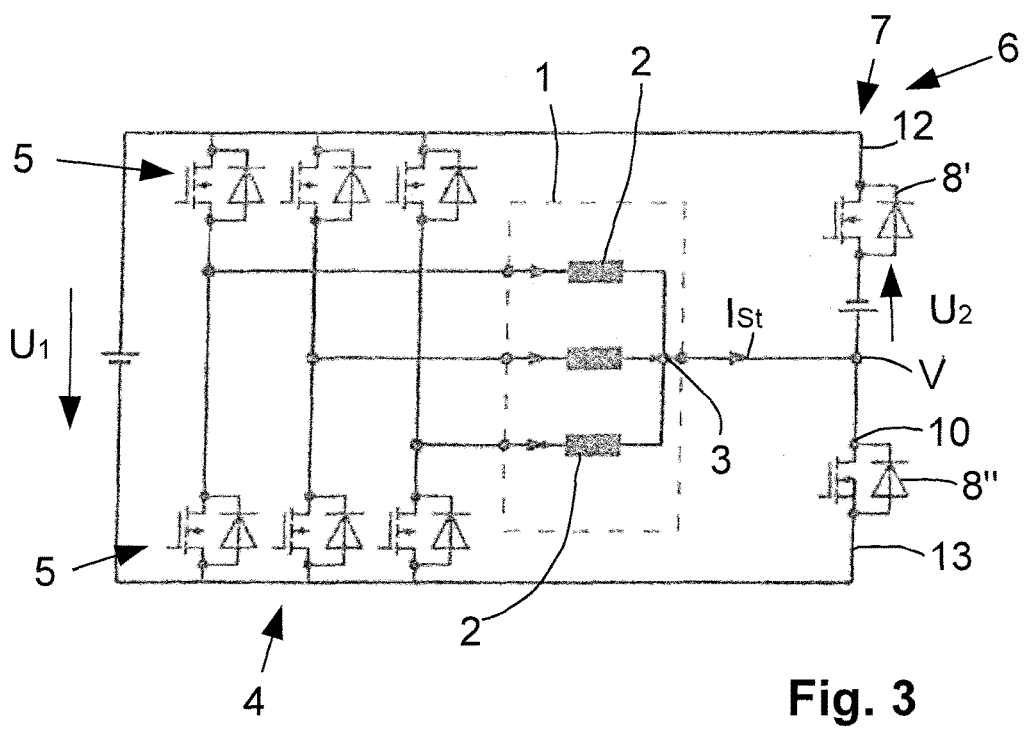

FIG. 3 a circuit assembly according to a third embodiment.

A circuit assembly according to the invention for linking different electrical voltage levels can be used for example in hybrid vehicles, electric vehicles and other applications in motor vehicles, which use an electric machine, such as a generator. Further fields of application are in the marine shipping industry or portable combustion engines.

FIG. 1 shows a circuit assembly (converter) for linking a DC voltage $U_1$ of a first voltage level and a DC voltage $U_2$ of a second voltage level. The DC voltages $U_1$, $U_2$ may be formed, for example, as energy storage or batteries and arranged in a motor vehicle. The DC voltage $U_1$ of the first voltage level may be, for example, 48 volts and the DC voltage $U_2$ of the second voltage level 12 volts. The DC voltage $U_1$ of the first voltage level thus feeds a 48 volt energy grid in the motor vehicle, connected to the consumers of high energy, such as an electric machine 1. The DC voltage $U_2$ of the second voltage level feeds a 12-volt energy grid in the motor vehicle, to which the consumers low energy can be connected.

The electric machine 1 is designed as a three-phase machine 1 with induction coils 2, which are connected together to form a star point 3 of a star connection. For driving the three-phase machine 1, an inverter is provided, which forms a first switching unit 4. The first switching unit 4 is a three-phase bridge circuit having six switching elements 5. The switching elements 5 may be formed as MOS-FET transistors with a freewheeling diode. The control of the switching elements 5 occurs by means of a control unit, not shown, which optionally also controls switching elements of a rectifier, not shown, and/or a DC intermediate circuit.

For a bidirectional electrical energy flow between the DC voltage $U_1$ of the first voltage level and the DC voltage $U_2$ of the second voltage level, a second switching unit 6 is provided which has two switching elements 8 connected in series in an additional switching branch 7. These switching elements 8 (first switching element 8', second switching element 8") of the second switching unit 6 are formed as MOS-FET transistors. The additional switching branch 7 of the second switching unit 6 is arranged parallel to the DC voltage $U_1$ of the first voltage level. A connection 9 of the first switching element 8' and a terminal 10 of the second switching element 8" are connected to the neutral point 3. The second switching unit 6 is thus connected in parallel with the first switching unit 4.

As can be seen from the figures, a branching point V is provided between the terminal 9 of the first switching element 8' and the terminal 10 of the second switching element 8", from which a connecting line leads to the neutral point 3.

According to a first embodiment of the invention according to FIG. 1, the DC voltage $U_2$ of the second voltage level is arranged between the branch point V and the neutral point 3.

A second embodiment of the circuit assembly according to FIG. 2 differs from the first embodiment according to FIG. 1 in that the DC voltage $U_2$ of the second voltage level is arranged in the additional switching branch 7. The DC voltage $U_2$ of the second voltage level is located between a further terminal 11 of the second switching element 8" and a ground terminal. The DC voltage $U_2$ of the second voltage level is thus in a lower second branch part 13 of the additional switching branch 7, which faces the ground terminal, while an upper first branch part 12 of the additional switching branch 7 exclusively has the first switching element 8'.

A further embodiment of the circuit according to FIG. 3 differs from the embodiment according to FIG. 2 in that the DC voltage $U_2$ of the second voltage level is in the upper branch part 12 of the additional switching branch 7, namely in the branch part 12 of the additional switching branch 7 remote from the ground side. In this embodiment, the DC voltage $U_2$ of the second voltage level is provided between the terminal 9 of the first switching element 8' and the branch point V.

Preferably, the first switching unit 4 and the second switching unit 6 are arranged on a common carrier, preferably on a common circuit board.

The switching elements 8', 8" of the second switching unit 6 are controlled such that a predetermined energy flow between the DC voltage $U_1$ and the DC voltage $U_2$ results. Depending on the consumers connected, a star current $i_{St}$ can flow with a predetermined magnitude either in the direction of the DC voltage $U_1$ of the first voltage level or in the direction of the DC voltage $U_2$ of the second voltage level. In addition, the electric machine 1 can be operated. The bidirectional energy flow is independent of the operating state of the electric machine 1. Since the second switching unit 6 is formed as an asymmetrical half bridge, the additional expenditure of providing a bidirectional energy flow is relatively low.

The switching elements 5 of the first switching unit 4 and the switching elements 8, 8', 8" of the second switching unit 6 are preferably formed identically.

The first switching unit 4 and the second switching unit 6 may be arranged, for example, together with the control unit, not shown, on a common carrier.

It is understood that the features mentioned above can be used individually or in combination in any combination. The described embodiments are not to be understood as exhaustive enumeration, but rather have exemplary character for the description of the invention.

The invention makes it possible to charge a large number of energy stores or batteries having different voltage levels, the DC voltage $U_1$ of the first voltage level preferably serving as the energy supplier. A DC-DC converter between the battery $U_1$ of higher voltage level and the battery $U_2$ of lower voltage level is not required. The star point of the electric machine 1 can be connected directly with the battery $U_2$, see FIG. 1, or connected to the battery $U_2$ of the second voltage level via an asymmetrical half-bridge, see FIGS. 2 and 3. The electric machine 1 can be operated in the same way as in conventional drive systems. The circuit assembly according to the invention enables a bidirectional energy flow between a plurality of electrical energy stores and a mechanical system. The electric machine 1 may be designed as a three-phase or multi-phase star connection with one or more star points. The phase voltage and the neutral point voltage of the machine 1 can be controlled via the switching unit 4. In particular, the phase currents and neutral point currents of the machine 1 can be controlled here. Consequently, the energy flow between the batteries $U_1$, $U_2$ and the machine 1 can thereby be controlled.

A control unit is provided for controlling the switching unit 4, wherein the control unit receives information about current parameters of the switching unit 4 and other sensors. The control unit 4 controls the switching elements 8, 8', 8" in such a way that the desired energy flow between the batteries $U_1$, $U_2$ and the machine 1 is ensured.

The invention claimed is:
1. A circuit assembly for linking different voltage levels in a motor vehicle, with
an electric machine (1) containing induction coils (2) connected in star circuit with a star point (3),
a first switching unit (4) containing switching elements (5) for generating an AC voltage for the electric machine (1) from a DC voltage ($U_1$) of a first voltage level,
a DC voltage ($U_2$) of a second voltage level, and
a second switching unit (6) for a bidirectional electric energy flow between the DC voltage ($U_1$) of the first voltage level and the DC voltage ($U_2$) of the second voltage level, wherein the second switching unit (6) has two switching elements (8, 8', 8") arranged in series in an additional switching branch (7), wherein the additional switching branch (7) is connected in parallel to the DC voltage ($U_1$) of the first voltage level and in each case a terminal (9, 10) of the switching elements (8, 8', 8") is connected to the star point (3),
wherein the DC voltage ($U_2$) of the second voltage level is provided in the additional switching branch (7), and
wherein the DC voltage ($U_2$) of the second voltage level is provided in a first branch part (12) of the additional switching branch (7) having a first switching element

(8') or in a second branch part (13) of the additional switching branch (7) having a second switching element (8").

2. The circuit assembly according to claim 1, wherein the switching elements (8, 8', 8") of the second switching unit (6) are controlled such that a predetermined energy flow occurs between the DC voltage ($U_1$) of the first voltage level and the DC voltage ($U_2$) of the second voltage level and the electric machine (1) or between the DC voltage ($U_1$) of the first voltage level and the DC voltage ($U_2$) of the second voltage level.

3. The circuit assembly according to claim 1, wherein between a terminal (9) of a first switching element (8') of the second switching unit (6) and a terminal (10) of a second switching element (8") of the second switching unit (6) a branch point (V) is arranged, which is electrically connected to the star point (3).

4. The circuit assembly according to claim 1, wherein the DC voltage ($U_2$) of the second voltage level is provided between the branch point (V) and the star point (3).

5. The circuit assembly according to claim 1, wherein the electrical machine (1) is a three-phase AC machine.

6. The circuit assembly according to claim 1, wherein the supply voltage of the DC voltage ($U_1$) of the first voltage level is higher than the supply voltage of the DC voltage ($U_2$) of the second voltage level.

7. The circuit assembly according to claim 1, wherein the first switching unit (4) and the second switching unit (6) are arranged on a common carrier.

8. A method for controlling a converter connected between a DC voltage ($U_1$) of a first voltage level and a DC voltage ($U_2$) of a second voltage level, which has an electric machine (1) having induction coils (2) arranged in a star point circuit, with a first switching unit (4) associated with the electrical machine (1) and a second switching unit (6) for a bidirectional flow of energy between the DC voltage ($U_1$) of the first voltage level and the DC voltage ($U_2$) of the second voltage level,
  wherein the DC voltage ($U_2$) of the second voltage level is provided in an additional switching branch (7),
  wherein the DC voltage ($U_2$) of the second voltage level is provided in a first branch part (12) of the additional switching branch (7) having a first switching element (8') or in a second branch part (13) of the additional switching branch (7) having a second switching element (8")
  the method comprising controlling the switching elements (8, 8', 8") of the second switching unit (6) in such a way that a star point current ($i_{St}$) of the electric machine (1) flows in a predetermined direction with a predetermined magnitude corresponding to the predetermined energy flow from the DC voltage ($U_1$) of the first voltage level to the DC voltage ($U_2$) of the second voltage level or from the DC voltage ($U_2$) of the second voltage level to the DC voltage ($U_1$) of the first voltage level.

\* \* \* \* \*